US012789737B2

(12) United States Patent
Sakata et al.

(10) Patent No.: US 12,789,737 B2
(45) Date of Patent: Nov. 10, 2026

(54) COLLISION DETECTION DEVICE, COLLISION DETECTION METHOD, AND COLLISION DETECTION PROGRAM

(71) Applicant: DENSO CORPORATION, Kariya-city (JP)

(72) Inventors: Mami Sakata, Kariya-city (JP); Yuki Iguchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 50 days.

(21) Appl. No.: 18/806,548

(22) Filed: Aug. 15, 2024

(65) Prior Publication Data

US 2024/0399992 A1 Dec. 5, 2024

Related U.S. Application Data

(63) Continuation of application No. PCT/JP2023/001178, filed on Jan. 17, 2023.

(30) Foreign Application Priority Data

Feb. 17, 2022 (JP) ................................ 2022-023041

(51) Int. Cl.
*B60R 21/0132* (2006.01)

(52) U.S. Cl.
CPC .............................. *B60R 21/0132* (2013.01); *B60R 2021/01322* (2013.01)

(58) Field of Classification Search
None
See application file for complete search history.

(56) References Cited

U.S. PATENT DOCUMENTS

2003/0132622 A1 7/2003 Yujiro et al.
2006/0273559 A1 12/2006 Yutaka et al.
(Continued)

FOREIGN PATENT DOCUMENTS

DE 102004029818 A1 1/2006
DE 102004046610 A1 3/2006
(Continued)

OTHER PUBLICATIONS

Front face collision detection device of vehicle (Year: 2019).*
Collision mode determination device and collision mode determination method (Year: 2001).*

*Primary Examiner* — James M Mcpherson
*Assistant Examiner* — Bakari Underwood
(74) *Attorney, Agent, or Firm* — Precision Patents, P.C.

(57) ABSTRACT

A collision detection device includes a first acceleration acquisition unit, a second acceleration acquisition unit, and a frontal collision determination unit. The first acceleration acquisition unit acquires longitudinal acceleration output from a left-side sensor and a right-side sensor. The second acceleration acquisition unit acquires the longitudinal acceleration output from a main sensor, which is an acceleration sensor different from the left-side sensor and the right-side sensor. A frontal collision determination unit determines an occurrence of the frontal collision based on a safing determination based on the longitudinal acceleration acquired at the first acceleration acquisition unit and a main determination based on the longitudinal acceleration acquired at the second acceleration acquisition unit.

8 Claims, 6 Drawing Sheets

(56) References Cited

U.S. PATENT DOCUMENTS

| | | | | |
|---|---|---|---|---|
| 2007/0271016 | A1 | 11/2007 | Loeckle et al. | |
| 2011/0187546 | A1* | 8/2011 | Liberman | G08B 21/00<br>340/669 |
| 2012/0310484 | A1 | 12/2012 | Hiroshi | |
| 2013/0110354 | A1 | 5/2013 | Shinichi | |
| 2015/0266439 | A1* | 9/2015 | Foo | B60R 21/0132<br>701/45 |
| 2019/0293679 | A1* | 9/2019 | Iguchi | G01P 15/18 |

FOREIGN PATENT DOCUMENTS

| | | | | |
|---|---|---|---|---|
| JP | H09-301113 | A | | 11/1997 |
| JP | 2001106018 | A | * | 4/2001 |
| JP | 2007050748 | A | | 3/2007 |
| JP | 2013124021 | A | | 6/2013 |
| JP | 2017105232 | A | | 6/2017 |
| JP | 2019018642 | A | | 2/2019 |
| JP | 2019156364 | A | | 9/2019 |
| JP | 2019172145 | A | * | 12/2019 |

* cited by examiner

COLLISION DETECTION DEVICE, COLLISION DETECTION METHOD, AND COLLISION DETECTION PROGRAM

CROSS-REFERENCE TO RELATED APPLICATION

The present application is the U.S. bypass application of International Application No. PCT/JP2023/001178 filed on Jan. 17, 2023 which designated the U.S. and claims priority to Japanese Patent Application No. 2022-023041 filed on Feb. 17, 2022, the contents of both of which are incorporated herein by reference.

TECHNICAL FIELD

The present disclosure relates to a collision detection device, a collision detection method, and a collision detection program that detects a frontal collision of a vehicle.

BACKGROUND

An airbag ECU described in JP 2013-95219 A is equipped with a main sensor and a safing sensor, which are acceleration sensors, and a control unit. ECU stands for Electronic Control Unit. The control unit controls airbag deployment/de-deployment based on the detection results of the main sensor and the safing sensor. Specifically, the control unit prepares for airbag deployment when the detection result of the safing sensor exceeds the safe threshold, and when the detection result of the main sensor exceeds the main threshold, the control unit determines that the deployment conditions have been met and sends a deployment instruction to the airbag. The safe threshold is set to a value smaller than the main threshold.

SUMMARY

A collision detection device is configured to detect a frontal collision of a vehicle.

According to one aspect of the present disclosure, the collision detection device includes:

- a left-side sensor, which is an acceleration sensor installed on the left-side of a vehicle body and detects longitudinal acceleration and lateral acceleration;
- a right-side sensor, which is an acceleration sensor installed on the right-side of the vehicle body and detects the longitudinal acceleration and the lateral acceleration;
- a first acceleration acquisition unit which acquires the longitudinal acceleration output from the left-side sensor and the right-side sensor;
- a second acceleration acquisition unit which acquires the longitudinal acceleration output from a main sensor, which is an acceleration sensor different from the left-side sensor and the right-side sensor and which detects the longitudinal acceleration; and
- a frontal collision determination unit which determines an occurrence of the frontal collision based on a safing determination based on the longitudinal acceleration acquired at the first acceleration acquisition unit and a main determination based on the longitudinal acceleration acquired at the second acceleration acquisition unit.

According to another aspect of the present disclosure, a collision detection method for detecting a frontal collision of a vehicle includes the following process or procedure:

- acquiring longitudinal acceleration output from a left-side sensor which is an acceleration sensor installed on the left-side of a vehicle body and which detects the longitudinal acceleration and lateral acceleration and a right-side sensor, which is an acceleration sensor installed on the right-side of the vehicle body and which detects the longitudinal acceleration and the lateral acceleration;
- acquiring the longitudinal acceleration output from a main sensor, which is an acceleration sensor different from the left-side sensor and the right-side sensor and which detects the longitudinal acceleration; and
- determining an occurrence of the frontal collision based on a safing determination based on the longitudinal acceleration acquired and a main determination based on the longitudinal acceleration acquired.

According to yet another aspect of the present disclosure, a collision detection program is a program to be executed by a collision detection device configured to detect a frontal collision of a vehicle, a process performed by the collision detection device includes:

- a process of acquiring longitudinal acceleration output from a left-side sensor, which is an acceleration sensor installed on the left-side of a vehicle body and which detects the longitudinal acceleration and lateral acceleration and a right-side sensor, which is an acceleration sensor installed on the right-side of the vehicle body and detects the longitudinal acceleration and the lateral acceleration;
- a process of acquiring the longitudinal acceleration output from a main sensor, which is an acceleration sensor different from the left-side sensor and the right-side sensor and which detects the longitudinal acceleration; and
- a process of determining an occurrence of the frontal collision based on a safing determination based on the longitudinal acceleration acquired and a main determination based on the longitudinal acceleration acquired.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
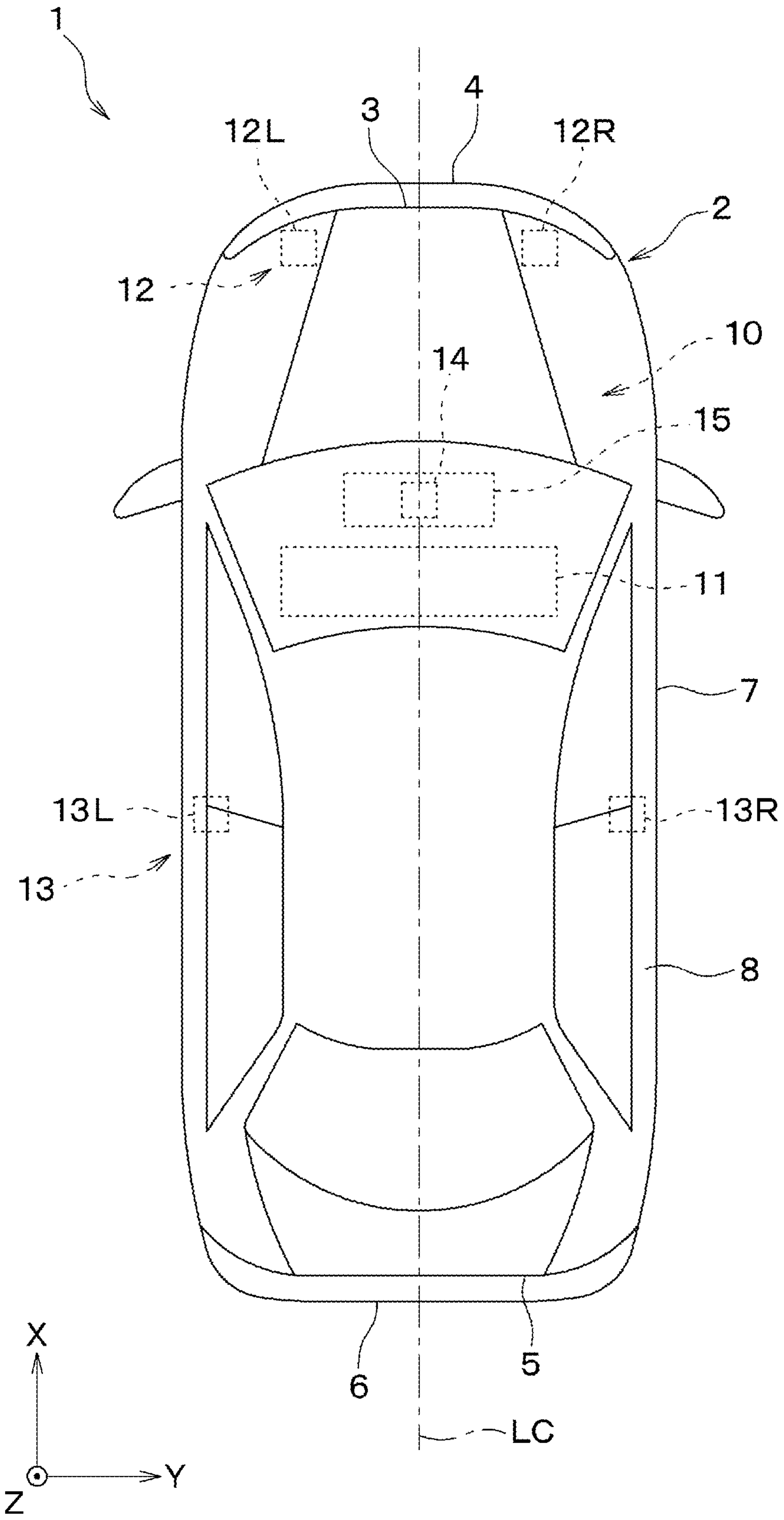
FIG. 1 is a plan view of a vehicle equipped with an in-vehicle system with a collision detection device according to an embodiment.

After diligent study, the inventor found the following issues. For example, the configuration described in JP 2013-95219 A disposes a safing determination sensor in the airbag ECU, which leads to an increase in equipment cost. On the other hand, a system that uses a so-called front sensor located in the front of the vehicle as a safing determination sensor can also be considered. However, from the standpoint of robustness against sensor failure and disconnection in the event of a frontal collision, it would be preferable to install a safing determination sensor in the airbag ECU, as in the configuration described in JP 2013-95219 A. The present disclosure was made considering the circumstances and other factors exemplified above. In other words, the present disclosure provides, for example, a collision detection device with high robustness against failures in acceleration sensors for safing determination and excellent frontal collision detection performance, while suppressing the equipment cost from increasing.

A collision detection device is configured to detect a frontal collision of a vehicle.

According to one aspect of the present disclosure, the collision detection device includes a left-side sensor, which is an acceleration sensor installed on the left-side of a vehicle body and detects longitudinal acceleration and lateral acceleration, a right-side sensor, which is an acceleration sensor installed on the right-side of the vehicle body and detects the longitudinal acceleration and the lateral acceleration, a first acceleration acquisition unit which acquires the longitudinal acceleration output from the left-side sensor and the right-side sensor, a second acceleration acquisition unit which acquires the longitudinal acceleration output from a main sensor, which is an acceleration sensor different from the left-side sensor and the right-side sensor and which detects the longitudinal acceleration, and a frontal collision determination unit which determines an occurrence of the frontal collision based on a safing determination based on the longitudinal acceleration acquired at the first acceleration acquisition unit and a main determination based on the longitudinal acceleration acquired at the second acceleration acquisition unit.

According to another aspect of the present disclosure, a collision detection method for detecting a frontal collision of a vehicle includes the following process or procedure:

acquiring longitudinal acceleration output from a left-side sensor which is an acceleration sensor installed on the left-side of a vehicle body and which detects the longitudinal acceleration and lateral acceleration and a right-side sensor, which is an acceleration sensor installed on the right-side of the vehicle body and which detects the longitudinal acceleration and the lateral acceleration, acquiring the longitudinal acceleration output from a main sensor, which is an acceleration sensor different from the left-side sensor and the right-side sensor and which detects the longitudinal acceleration, and determining an occurrence of the frontal collision based on a safing determination based on the longitudinal acceleration acquired and a main determination based on the longitudinal acceleration acquired.

According to yet another aspect of the present disclosure, a collision detection program is a program to be executed by a collision detection device configured to detect a frontal collision of a vehicle, a process performed by the collision detection device includes a process of acquiring longitudinal acceleration output from a left-side sensor, which is an acceleration sensor installed on the left-side of a vehicle body and which detects the longitudinal acceleration and lateral acceleration and a right-side sensor, which is an acceleration sensor installed on the right-side of the vehicle body and detects the longitudinal acceleration and the lateral acceleration, a process of acquiring the longitudinal acceleration output from a main sensor, which is an acceleration sensor different from the left-side sensor and the right-side sensor and which detects the longitudinal acceleration, and a process of determining an occurrence of the frontal collision based on a safing determination based on the longitudinal acceleration acquired and a main determination based on the longitudinal acceleration acquired.

Embodiments

Hereinafter, embodiments of the present disclosure will be described with reference to the drawings. It should be noted that various modifications applicable to an embodiment may hinder the understanding of the embodiment if they are inserted in the middle of a series of explanations about the embodiment. For this reason, modifications are described collectively after the description of the series of embodiments.

(In-Vehicle System Configuration)

First, a schematic configuration of a vehicle 1 to which the embodiment is applied is described with reference to FIG. 1. For convenience of explanation, an XYZ three-dimensional coordinate system is set as shown in the figure. An x-axis direction is a longitudinal direction, i.e., an overall length direction of the vehicle, and is parallel to a vehicle centerline LC. The vehicle centerline LC is an imaginary line passing through the center point of the vehicle 1 in plan view. A positive direction of the X-axis corresponds to the vehicle traveling direction when traveling forward. A Y-axis direction is a lateral direction, i.e., a vehicle width direction. AZ-axis direction is a direction of vehicle height, which is parallel to the direction of action of gravity when the vehicle 1 is stably placed on a horizontal surface in a runnable condition.

The vehicle 1 is a so-called automobile, and has a box-shaped vehicle body 2. A front bumper 4 is attached to a front 3 of the vehicle body 2. A rear bumper 6 is attached to a rear 5 of the vehicle body 2. Side panels 8, such as door panels, are attached to sides 7 of the vehicle body 2.

The vehicle 1 is equipped with an in-vehicle system 10. The vehicle 1 equipped with the in-vehicle system 10 is hereinafter referred to as an own vehicle. The in-vehicle system 10 is configured to control an activation of an occupant protection devices 11 installed in the own vehicle. In other words, the in-vehicle system 10, which may also be referred to as an occupant protection system, is configured to protect the occupants of the own vehicle with the occupant protection device 11 in the event of a collision between the own vehicle and an object present outside the own vehicle.

In the present embodiment, the occupant protection device 11 is a protective device for a frontal collision, and is equipped with a driver's airbag and a front passenger's airbag. A term frontal collision refers to a collision in which the impact is applied to the vehicle body 2 from the front. Frontal collisions include a head-on collision, an offset frontal collision, and an oblique frontal collision. The head-on collision is a frontal collision with an overlap ratio of substantially 100%. The overlap ratio is a ratio of the vehicle width dimension of the collision area of the vehicle body 2 with an object to be collied to the vehicle width. The vehicle width is the vehicle width dimension of the vehicle body 2. The head-on collision can also be referred to as a full-wrap frontal collision. The offset frontal collision is a frontal collision with an overlap ratio less than a predetermined value (e.g., 90%). The oblique frontal collision is a frontal collision in which corners of the front 3 of the vehicle body 2 collide with an object to be collied having a longitudinal or shortitudinal direction that is inclined to the vehicle centerline LC in plan view. The oblique frontal collision is also referred to as an oblique collision or an oblique offset collision. A typical example of an oblique frontal collision is a collision with a relative angle of 15° and an overlap ratio of about 35%, which is equivalent to the test conditions for an oblique collision test specified by the NHTSA. NHTSA stands for National Highway Traffic Safety Administration. A frontal collision other than the head-on collision is referred to as an asymmetric collision. In other words, the asymmetric collision is a type of collision in which one of the left or right sides of the front 3 of the vehicle body 2 collides with an object, such as another vehicle.

Front sensors 12 are disposed at the front in the vehicle body 2. The front sensors 12 are attached to unshown body parts that support the front bumper 4 from inside the vehicle body 2. The front sensors 12 are disposed in pairs on the left and right. In other words, a left-front sensor 12L and a right-front sensor 12R are mounted on the vehicle body 2. The left-front sensor 12L and the right-front sensor 12R are symmetrically located across the vehicle centerline LC. The front sensor 12 is a so-called uniaxial sensor, and is configured to detect the longitudinal acceleration (i.e., acceleration in the X-axis direction) acting on the vehicle body 2 when a collision between the own vehicle and an object occurs, and to output the detection results.

Side sensors 13 are disposed on the left and right sides in the vehicle body 2. In other words, the side sensors 13 are located at both ends of the vehicle body 2 in the vehicle width direction and in the middle of the vehicle in the overall length direction (e.g., in the substantially center position). Specifically, a left-side sensor 13L and a right-side sensor 13R are mounted on the vehicle body 2. The left-side sensor 13L and the right-side sensor 13R are symmetrically located across the vehicle centerline LC. The side sensor 13 is a so-called biaxial sensor, and is configured to detect the lateral acceleration (i.e., Y-axis acceleration) and longitudinal acceleration acting on the vehicle body 2 when a collision between the own vehicle and an object occurs, and to output the detection results.

In addition to the occupant protection device 11, the front sensors 12, and the side sensors 13, the in-vehicle system 10 is equipped with a main sensor 14. The main sensor 14 is located on the vehicle centerline LC in plan view, while being accommodated inside the vehicle body 2. The main sensor 14 is a so-called uniaxial sensor, and is configured to detect the longitudinal acceleration acting on the vehicle body 2 when a collision occurs between the own vehicle and an object, and to output the detection results. The main sensor 14, which is a floor sensor, is built into an electronic control unit 15.

(Collision Detection Device)

The electronic control unit 15 is configured as a so-called airbag ECU. In other words, in the present embodiment, the electronic control unit 15, which functions as a collision detection device, is configured to detect a frontal collision of the own vehicle and activate the occupant protection device 11 for a frontal collision based on the output of the front sensors 12, the side sensors 13, and the main sensor 14. Specifically, the electronic control unit 15 is configured as an in-vehicle microcomputer with a CPU, a ROM, a RAM, a non-volatile rewritable memory, etc., which are not shown. The non-volatile rewritable memory is a storage device that allows information to be rewritten while the power is on, but retains information in a non-rewritable manner while the power is off, and is, for example, a flash ROM. The ROM, the RAM, and the non-volatile rewritable memory are non-transitory tangible storage media. The electronic control unit 15 is configured to control the operation of the in-vehicle system 10 by reading and executing a control program stored in the ROM or the non-volatile rewritable memory.

Figure 2:
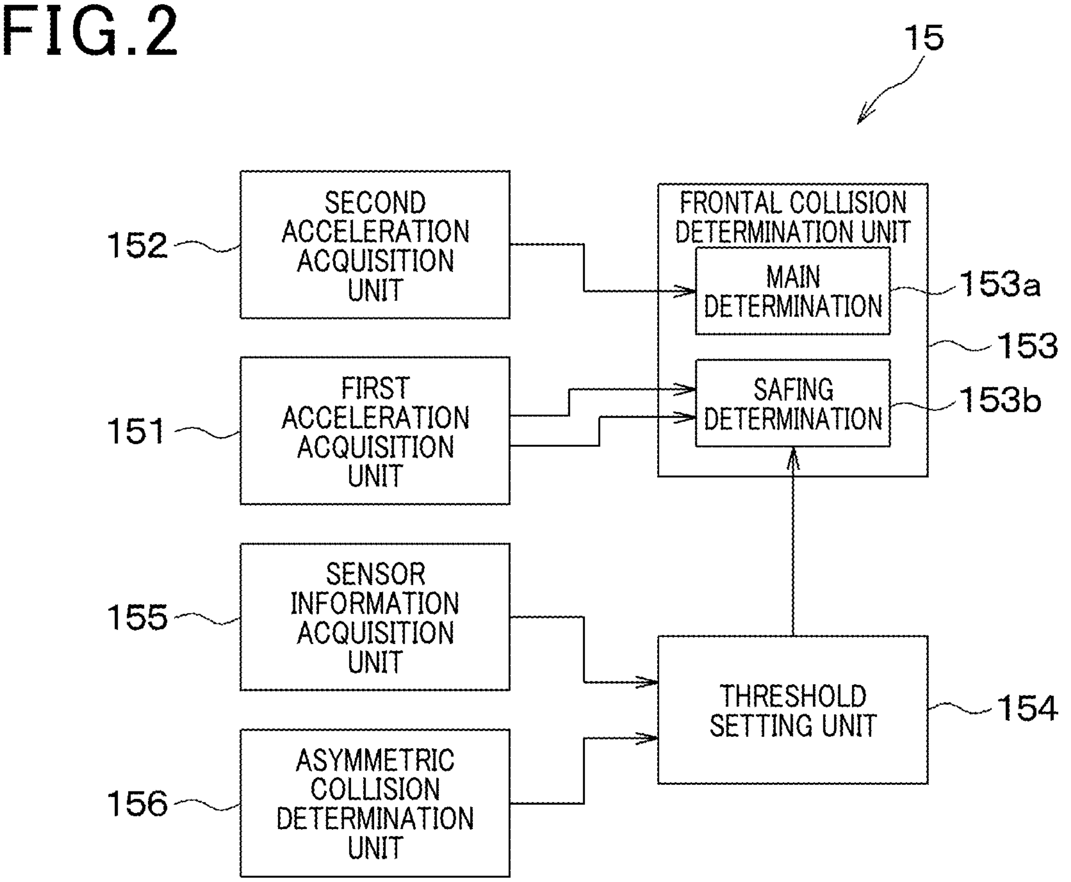
FIG. 2 is a block diagram showing a schematic functional configuration in the collision detection device shown in FIG. 1.

As shown in FIG. 2, the electronic control unit 15 is equipped with a first acceleration acquisition unit 151, a second acceleration acquisition unit 152, and a frontal collision determination unit 153 as a functional configuration realized by program execution on the in-vehicle microcomputer. The first acceleration acquisition unit 151 is configured to acquire the longitudinal acceleration output from the side sensors 13, i.e., the left-side sensor 13L and the right-side sensor 13R, and output the acquired result to the frontal collision determination unit 153. In other words, the first acceleration acquisition unit 151 is configured to receive the output signals of the longitudinal acceleration from the left-side sensor 13L and the right-side sensor 13R. The second acceleration acquisition unit 152 is configured to acquire the longitudinal acceleration output from the main sensor 14, which is an acceleration sensor different from the left-side sensor 13L and the right-side sensor 13R, and output the acquired result to the frontal collision determination unit 153. In other words, the second acceleration acquisition unit 152 is configured to receive the output signal of the longitudinal acceleration from the main sensor 14. The frontal collision determination unit 153 determines the occurrence of a frontal collision based on the longitudinal acceleration acquired at the first acceleration acquisition unit 151 and the second acceleration acquisition unit 152. Specifically, the frontal collision determination unit 153 determines an occurrence of a frontal collision based on a safing determination based on the longitudinal acceleration acquired by the first acceleration acquisition unit 151 and a main determination based on the longitudinal acceleration acquired by the second acceleration acquisition unit 152.

Figure 3:
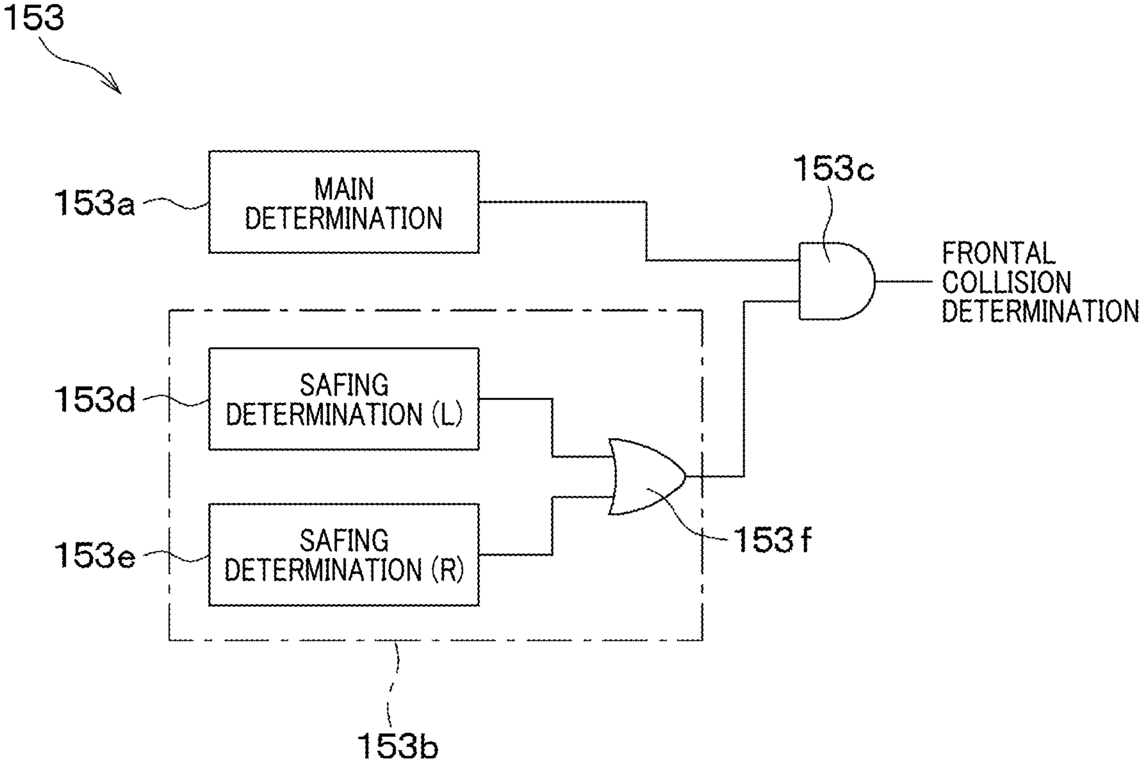
FIG. 3 is a block diagram showing an example of a collision determination logic configuration in the frontal collision determination unit shown in FIG. 2.

In more detail, as shown in FIG. 3, the frontal collision determination unit 153 includes a main determination logic 153*a*, a safing determination logic 153*b*, and a frontal collision determination logic 153*c* as the logic configuration for frontal collision determination. The main determination logic 153*a* turns on the main determination (i.e., outputs the logic value 1) when the longitudinal acceleration output from the main sensor 14 and acquired by the second acceleration acquisition unit 152 exceeds a predetermined main determination threshold value. On the other hand, the main determination logic 153*a* turns off the main determination (i.e., outputs the logic value 0) when the longitudinal acceleration acquired by the second acceleration acquisition unit 152 does not exceed the main determination threshold value. The safing determination logic 153*b* is configured to output the result of the safing decision. In other words, the safing determination logic 153*b* is configured to output the logic value 1 when the safing determination to the effect that a frontal collision has occurred is satisfied, and output the logic value 0 when it is not satisfied. The frontal collision determination logic 153*c* is an AND gate, which outputs the logical product of the output of the main determination logic 153*a* and the output of the safing determination logic 153*b*. In other words, the frontal collision determination logic 153*c* determines (i.e., outputs a logic value of 1) that a frontal collision has occurred when both the main determination and the safing determination are satisfied. On the other hand, the frontal collision determination logic 153*c* determines (i.e., outputs the logic value 0) that no frontal collision has occurred when at least one of the main determination and the safing determination is not satisfied.

The safing determination logic 153*b* includes a left-side determination logic 153*d*, a right-side determination logic 153*e*, and an OR gate 153*f*. The left-side determination logic 153*d* is configured to turn on the left-side safing determination (i.e., outputs a logic value of 1) when the longitudinal acceleration output from the left-side sensor 13L and acquired by the first acceleration acquisition unit 151 exceeds a predetermined safing determination threshold value. On the other hand, the left-side determination logic 153*d* is configured to turn off the left-side safing determination (i.e., outputs the logic value 0) when the longitudinal acceleration acquired by the first acceleration acquisition unit 151 does not exceed the safing determination threshold value. The right-side determination logic 153*e* is configured to turn on the right-side safing determination (i.e., output a logic value of 1) when the longitudinal acceleration output from the right-side sensor 13R and acquired by the first acceleration acquisition unit 151 exceeds the predetermined safing determination threshold value. On the other hand, the right-side determination logic 153*e* is configured to turn off the left-side safing determination (i.e., outputs the logic value 0) when the longitudinal acceleration acquired by the first acceleration acquisition unit 151 does not exceed the safing determination threshold value. The OR gate 153*f* is configured to output the logical sum of the output of the left-side determination logic 153*d* and the output of the right-side determination logic 153*e*. In other words, the safing determination logic 153*b* is configured to turn on the safing determination (i.e., outputs the logic value 1) when at least one of the left-side or the right-side safing determination is satisfied. On the other hand, the safing determination logic 153*b* is configured to turn off the safing determination (i.e., outputs a logic value of 0) when neither the left-side or right-side safing determination is satisfied.

In addition, as shown in FIG. 2, the electronic control unit 15 includes a threshold setting unit 154 and a sensor information acquisition unit 155 as a functional configuration realized by program execution on the in-vehicle microcomputer. The threshold setting unit 154 is configured to set the threshold value for the frontal collision determination, which is a threshold value for the safing determination by the safing determination logic 153*b* in the frontal collision determination unit 153. In other words, the frontal collision determination unit 153 is configured to determine that a frontal collision has occurred when the longitudinal acceleration detected by the left-side sensor 13L or the right-side sensor 13R exceeds the threshold value for the frontal collision determination set by the threshold setting unit 154. The sensor information acquisition unit 155 is configured to acquire sensor diagnosis information, that is, whether the left-side sensor 13L and right-side sensor 13R are normal or faulty. Then, in the present embodiment, the threshold setting unit 154 performs a predetermined sensitization process when one of the left-side sensor 13L and the right-side sensor 13R is faulty and the other is not. The sensitization process is a process of lowering the safing determination threshold for longitudinal acceleration detected by the other sensor, which is different from the one that failed, compared to a case where both sensors have not failed. One of the failed sensors corresponds to a first side sensor in the present disclosure. Another sensor, that has not failed, corresponds to a second side sensor in the present disclosure.

Figure 4:
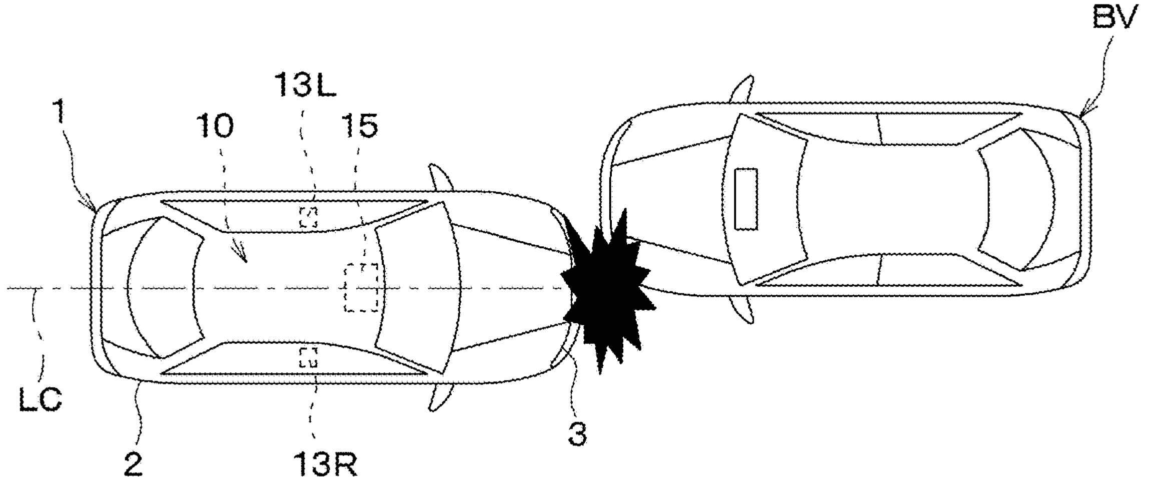
FIG. 4 is a plan view of the vehicle shown in FIG. 1 in an offset collision with another vehicle.

Furthermore, the electronic control unit 15 includes an asymmetric collision determination unit 156 as a functional configuration realized by program execution on the in-vehicle microcomputer. The asymmetric collision determination unit 156 is configured to determine that the frontal collision is an asymmetric collision. The threshold setting unit 154 is configured to perform the sensitization process when the asymmetric collision determination unit 156 determines an asymmetric collision. In the present embodiment, the asymmetric collision determination unit 156 is capable of lateral collision determination, i.e., whether the asymmetric collision is a collision on the right or left-side of the own vehicle. The threshold setting unit 154 then executes the sensitization process when the asymmetric collision determination unit 156 determines an asymmetric collision has occurred and one of the failed sensors is a collision side sensor. The term collision side sensor shall be defined as follows. When the own vehicle is divided into two parts on the left and right by the vehicle centerline LC, one part is a first region and another is a second region. In a case of an asymmetrical collision with an object in the first region, the sensor that is present in the first region among the left-side sensor 13L and the right-side sensor 13R is the collision side sensor. On the other hand, of the left-side sensor 13L and the right-side sensor 13R, a sensor that is not the collision side sensor in the event of an asymmetric collision is referred to as the non-collision side sensor. As shown in FIG. 4, when the left front part of the own vehicle collides with another vehicle BV, the left-side sensor 13L corresponds to the collision side sensor and the right-side sensor 13R corresponds to the non-collision side sensor. Further, the threshold setting unit 154 resets the sensitization process when a predetermined time has elapsed after the sensitization process is executed.

(Operational Overview)

The following is an overview of the operation of the present embodiment, using as a specific example a case where the left front part of the own vehicle collides with another vehicle BV, as shown in FIG. 4, and with reference to FIGS. 1 through 7, as well as the effects produced by the present embodiment. It should be noted that the device configuration and the collision detection method and collision detection program executed by the device configuration may be collectively referred to as the present embodiment.

A possible configuration is to install a sensor for the safing determination in the airbag ECU or to use the front sensor 12 as a sensor for the safing determination. Contrasting the two, from the standpoint of robustness against sensor failure and disconnection in the event of a frontal collision, it would be preferable to install a safing determination sensor in the airbag ECU, as in the former configuration. However, in such a configuration, the safing determination sensor is installed in the airbag ECU, which leads to an increase in equipment cost. Therefore, it is required in recent years to have high robustness against disconnection e and sensor failure, while minimizing the increase in equipment cost as much as possible.

Figure 5:
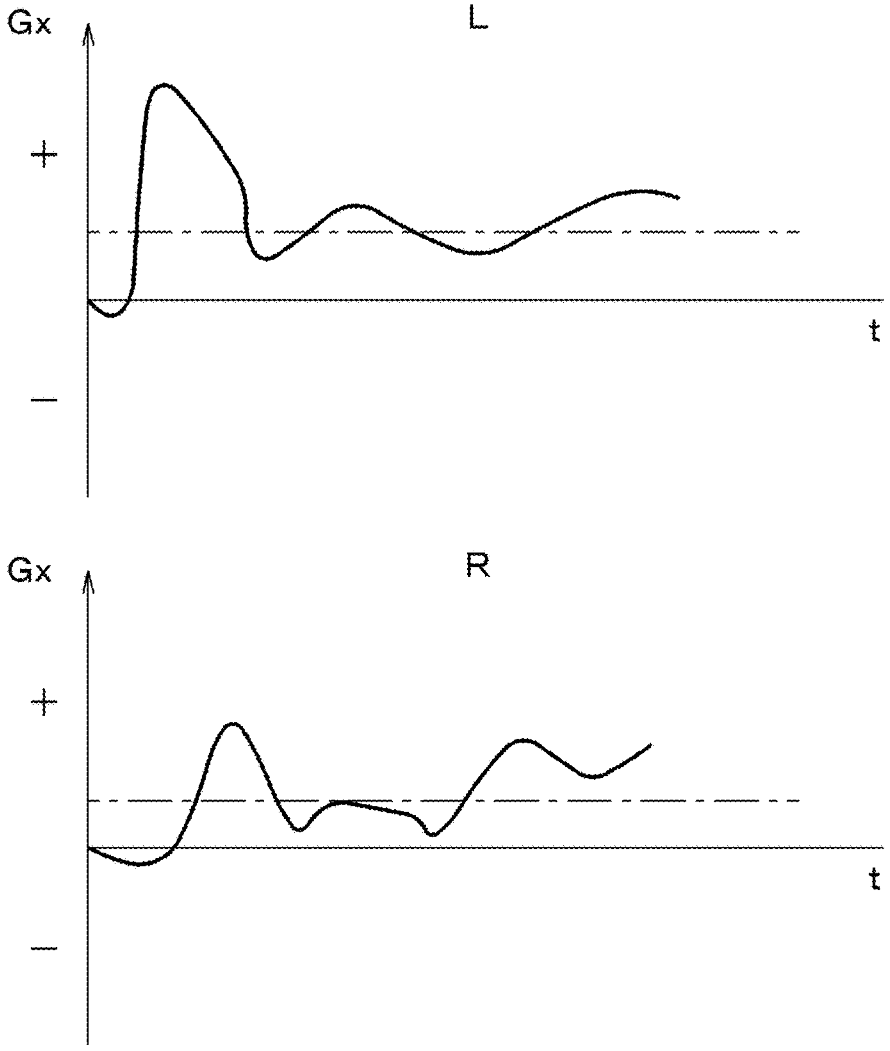
FIG. 5 is a graph showing an example of an output from a side sensor shown in FIG. 1 when the offset collision occurs.

Therefore, the inventor discovered that the above-mentioned problems can be solved by using a biaxial sensor as a side sensor 13 and using the forward/r backward acceleration detected by such a biaxial sensor to perform a safing determination of the occurrence of a frontal collision. FIG. 5 shows an example of output waveforms at each of the pair of side sensors 13 when an offset frontal collision occurs in the manner shown in FIG. 4. Note that in FIG. 5, a horizontal axis t indicates time, a vertical axis Gx indicates longitudinal acceleration, L indicates an output waveform of the left-side sensor 13L, R indicates an output waveform of the right-side sensor 13R, and a dashed-dotted line indicates the safing determination threshold value. In this example, the left and right safing determination threshold values are assumed to be the same. According to this configuration, the robustness against disconnection at the time of a frontal collision is improved by using the side sensor 13, which suffers less damage at the time of a frontal collision, to make the safing determination. In addition, it is possible to make the safing determination without a safing determination sensor in the electronic control unit 15, which is the airbag ECU, thereby reducing the cost of the device.

Figure 6:
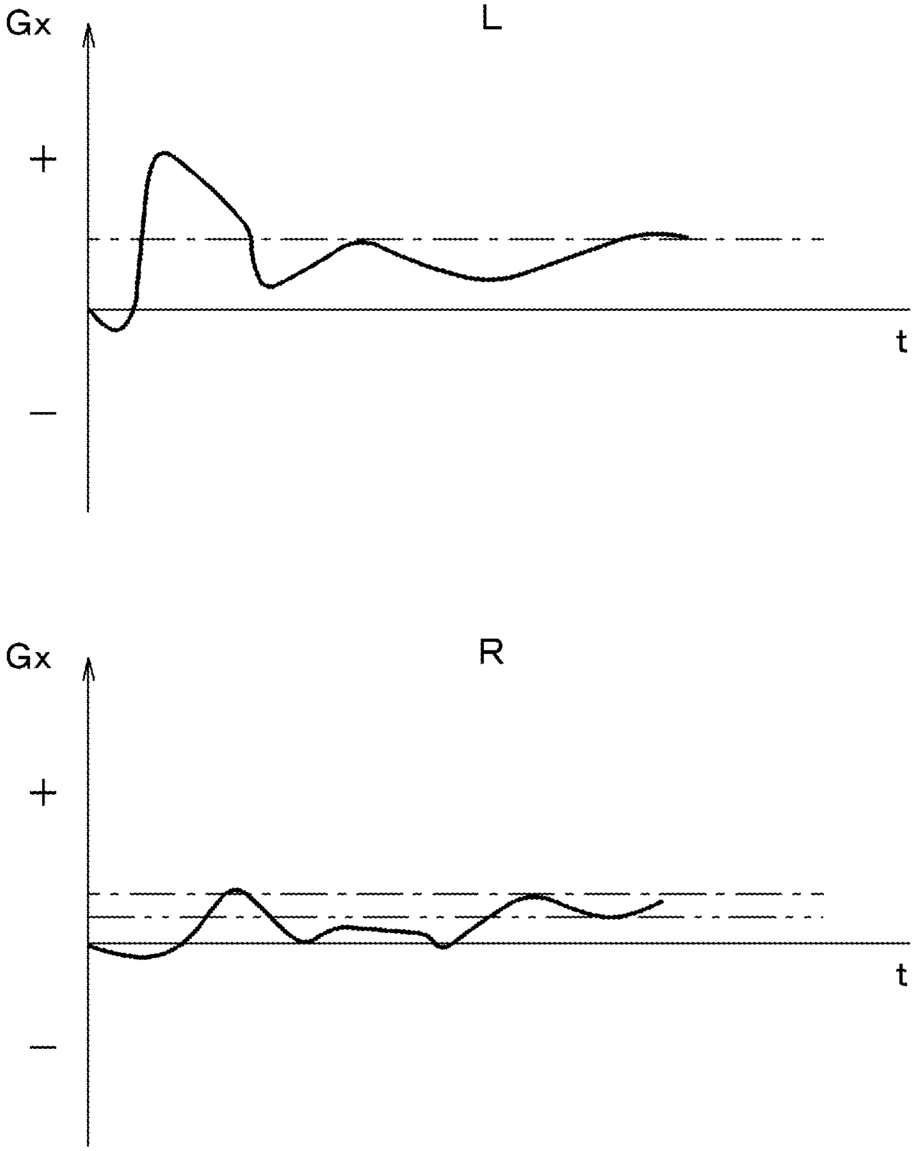
FIG. 6 is a graph showing another example of an output from the side sensor shown in FIG. 1 when the offset collision occurs.

It should be noted that if the collision speed, i.e., the relative speed between the own vehicle and the other vehicle BV, is small, the output at the non-collision side sensor may be small and not exceed the normal safing determination threshold value, as shown in FIG. 6. In this regard, the present embodiment performs a sensitization process to lower the threshold value for the safing determination, as shown by the double-dotted line in FIG. 6, so that even if the sensor on the collision side fails, the output from the sensor on the non-collision side can be used to determine the safing well. This allows for a good safing determination of the frontal collision using the side sensors 13.

As described above, a phenomenon where the output of the non-collision side sensor becomes small occurs in asymmetric collisions. Therefore, when asymmetric collision is determined by the asymmetric collision determination unit 156 and the collision side sensor has failed, the present embodiment executes the sensitization process for the non-collision side sensor. Asymmetric collisions can be determined, for example, using the front sensors 12, collision detection sensors in the front bumper 4 for activating pedestrian protection devices, and ADAS system sensors (e.g., cameras). This allows more precise activation of the occupant protection device 11 for frontal collision.

To further improve the activation control of the occupant protection device 11 for frontal collision, the sensitization process by lowering the safing determination threshold value should be done to the minimum extent necessary. Therefore, in the present embodiment, sensitization processing is limited to sensor failure and asymmetric collision occurrence. Furthermore, in the present embodiment, when a predetermined time has elapsed after the sensitization process has been executed, the sensitization process is reset. The predetermined time is the time that is normally assumed to elapse between the main determination being made and the safing determination being made in the event of a frontal collision requiring activation of the occupant protection device 11 for the frontal collision. Specifically, the time point at which the predetermined time elapses is the time point corresponding to the ignition timing of the second stage squib. The elapse of the predetermined time can be done, for example, using an unshown timer in the electronic control unit 15.

Figure 7:
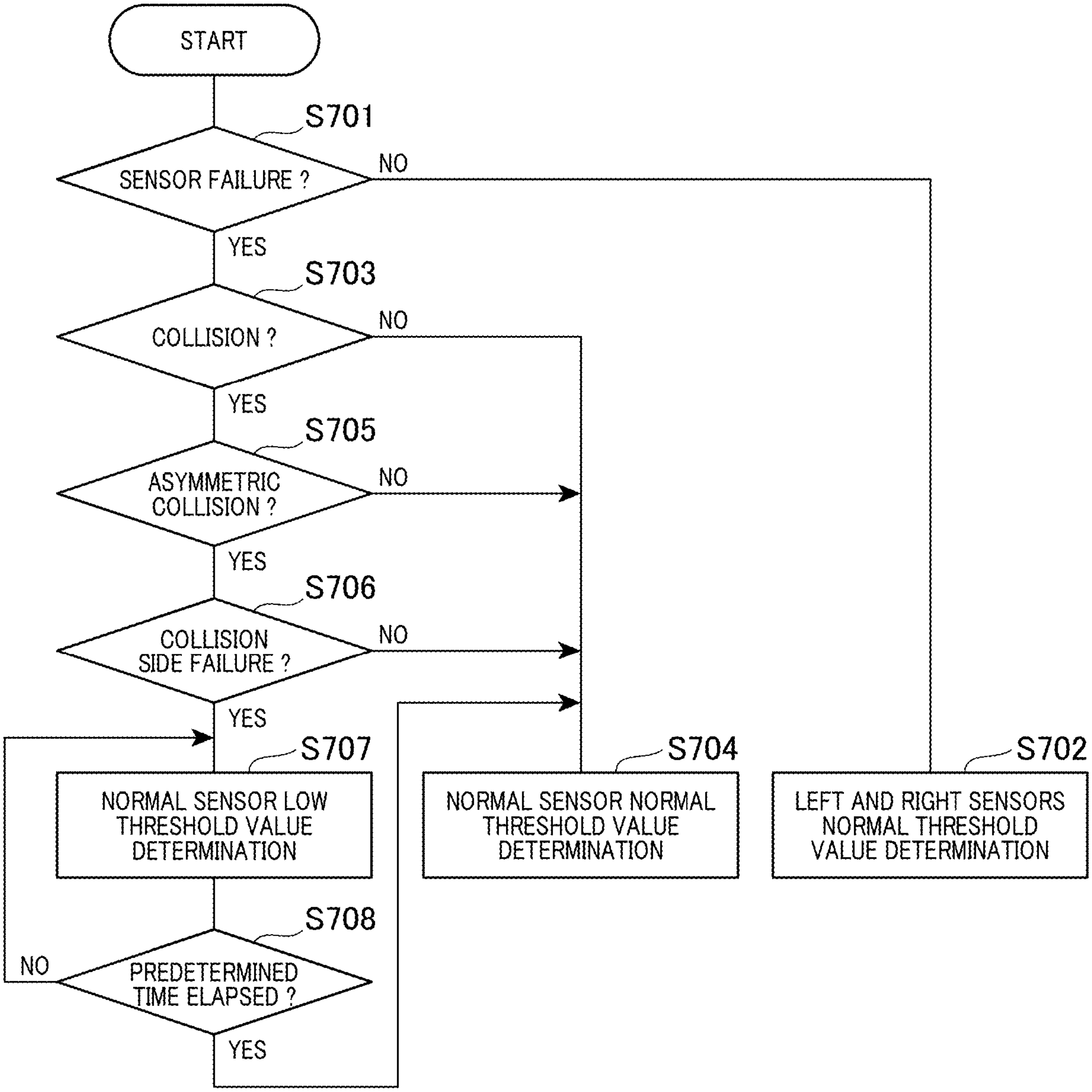
FIG. 7 is a flowchart showing an example of an operation by the frontal collision determination unit shown in FIGS. 2 and 3.

FIG. 7 shows an overview of a frontal collision determination process by the electronic control unit 15. It should be noted that in the flowchart shown in FIG. 7, S is an abbreviation for step.

First, in step 701, the electronic control unit 15 obtains sensor diagnosis information, that is, whether the left-side sensor 13L and the right-side sensor 13R are normal or faulty, and determines whether any sensor is faulty. If no failure occurs in any of the sensors (i.e., step 701=NO), the electronic control unit 15 performs step 702. At step 702, the electronic control unit 15 sets thresholds for the left-side determination logic 153*d* and the right-side determination logic 153*e* in the safing determination logic 153*b* to normal threshold values.

In contrast, if any sensor is faulty (i.e., step 701=YES), the electronic control unit 15 performs step 703. At step 703, the electronic control unit 15 determines whether a collision has occurred based on the output of the main sensor 14. The process of step 703 corresponds to the main determination. If the main determination fails (i.e., step 703=NO), the electronic control unit 15 performs step 704. At step 704, the electronic control unit 15 sets the safing determination threshold value corresponding to the non-faulty sensor in the left-side determination logic 153*d* and the right-side determination logic 153*e* in the safing determination logic 153*b* to the normal threshold value.

If the main determination is satisfied (i.e., step 703=YES), the electronic control unit 15 performs step 705. At step 705, the electronic control unit 15 determines whether the collision that is determined to have occurred due to the main determination being satisfied is an asymmetric collision. If it is not an asymmetric collision (i.e., step 705=NO), the electronic control unit 15 performs step 704. In contrast, if it is an asymmetric collision (i.e., step 705=YES), the electronic control unit 15 performs step 706. At step 706, the electronic control unit 15 determines whether the sensor that was determined to be faulty at step 701 is the collision side sensor. If the failed sensor is a non-collision side sensor (i.e., step 706=NO), the electronic control unit 15 performs step 704. In other words, if the sensor that has not failed is the collision side sensor rather than the non-collision side sensor, a good safing determination can be made even with the normal threshold value. For this reason, the electronic control unit 15 sets the normal threshold of the left-side determination logic 153*d* and the right-side determination logic 153*e* in the safing determination logic 153*b* to the normal threshold corresponding to the collision side sensor that has not failed. In contrast, if the failed sensor is the collision side sensor (i.e., step 706=YES), the electronic control unit 15 performs step 707. At step 707, the electronic control unit 15 performs the sensitization process. In other words, the electronic control unit 15 sets the safing determination threshold value corresponding to the non-collision side sensor that has not failed to a low threshold value in the left-side determination logic 153*d* and right-side determination logic 153*e* in the safing determination logic 153*b*.

After executing the sensitization process in step 707, in step 708, the electronic control unit 15 determines whether a predetermined time has elapsed since the sensitization process was executed. Before the predetermined time elapses (i.e., step 708=NO), the electronic control unit 15 maintains the low threshold setting state with the sensitization process. In contrast, if a predetermined time has elapsed (i.e., step 708=YES), the electronic control unit 15 resets the low threshold setting state by the sensitization process and sets the safing determination threshold value corresponding to the non-collision side sensor that has not failed to the normal threshold value (i.e., step 704).

(Modification)

The present disclosure is not limited to the above embodiments. Therefore, modifications can be made to the above embodiments as appropriate. Typical modifications are described below. In the following description of the modifications, differences from the above embodiment are mainly explained. In addition, in the above embodiments and the following modifications, parts that are identical or equal are given the same reference numerals. Therefore, in the description of the following modifications, the description in the above embodiment may be aided as appropriate for components that have the same reference numerals as those in the above embodiment, unless there is a technical inconsistency or a special additional explanation.

The present disclosure is not limited to the specific device configuration shown in the above embodiments. That is, for example, the applicable vehicle 1 is not limited to four-wheeled vehicles. Specifically, a vehicle 1 may be a three-wheeled vehicle, or a six- or eight-wheeled vehicle such as a cargo truck. The type of the vehicle 1 may be a car equipped only with an internal combustion engine, an electric or fuel cell vehicle without an internal combustion engine, or a so-called hybrid vehicle. The shape and structure of the vehicle body 2 is also not limited to a box shape, i.e., a rectangular shape in plan view.

The present disclosure may also be suitably applied to cases where occupant protection devices 11 other than for frontal collisions or pedestrian protection devices are installed.

As described in the above embodiment, the side sensors 13 can be used to detect a frontal collision and activate the occupant protection device 11 for a frontal collision. Therefore, the front sensors 12 can be omitted. However, from the viewpoint of earlier determination of typical frontal collisions and redundancy, the front sensors 12 and frontal collision determination using them can be provided in parallel with the collision determination using the side sensors 13 in the above embodiment. The same is true for the main sensor 14, which can be used together, although it can be omitted from the point of view of making the present disclosure at a minimum feasible. The safing determination may be made redundant by installing a safing determination sensor in the electronic control unit 15, which is the airbag ECU.

All or part of the electronic control unit 15 may be configured with digital circuits, e.g., ASICs or FPGAs, configured to allow operation as described above. ASIC stands for Application Specific Integrated Circuit. FPGA stands for Field Programmable Gate Array. In other words, the in-vehicle microcomputer portion and the digital circuit portion can coexist in the electronic control unit 15.

Thus, each of the above functional configurations and methods may be realized by a dedicated computer provided by configuring a processor and memory programmed to perform one or more functions embodied by the computer program. Alternatively, each of the above functional configurations and methods may be realized by a dedicated computer provided by configuring the processor with one or more dedicated hardware logic circuits. Alternatively, each of the above functional configurations and methods may be realized by one or more dedicated computers composed of a processor and memory programmed to perform one or more functions, in combination with a processor composed of one or more hardware logic circuits. In addition, the computer program may also be stored in a computer-readable non-transitory tangible storage media as instructions to be executed by a computer. In other words, each of the above functional configurations and methods can also be expressed as a computer program containing procedures for realizing the same, or as a non-transitory tangible storage media storing the program.

Figure 8:
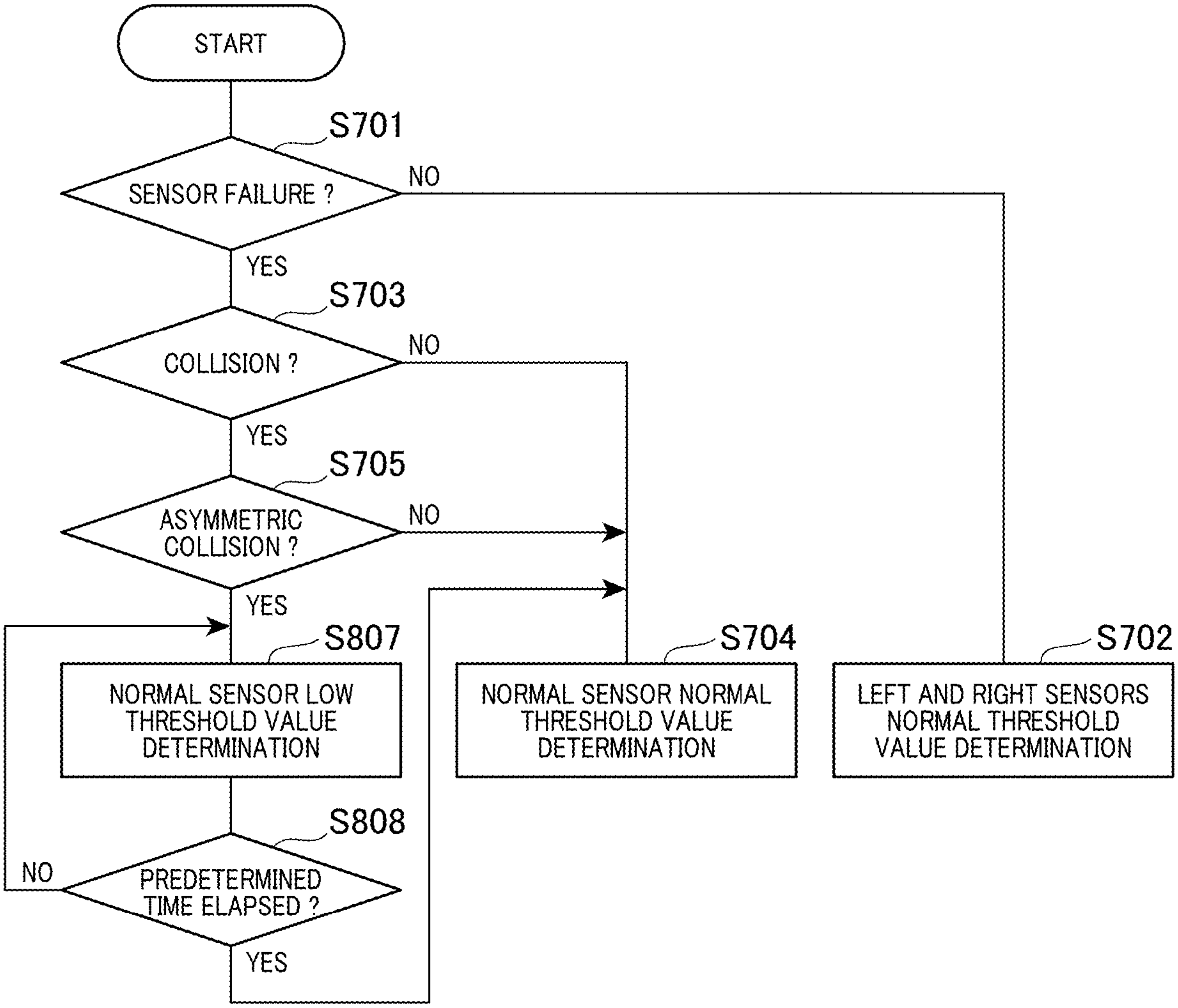
FIG. 8 is a flowchart showing an example of another operation by the frontal collision determination unit shown in FIGS. 2 and 3.

There could be cases where asymmetric collisions can be determined but not lateral collision determination, such as a configuration where asymmetric collisions are determined by the output of the main sensor 14. In this case, it is useful to make the non-failing sensor sensitive to the impact, whether on the collision side or not, so that the occupant protection device 11 can be deployed when a relatively large impact input is made against the vehicle body 2. Therefore, the threshold setting unit 154 may perform the sensitization process when the asymmetric collision determination unit 156 determines an asymmetric collision, regardless of whether the sensor that has not failed is the collision side sensor. FIG. 8 is a flowchart corresponding to such an embodiment. In other words, the flowchart in FIG. 8 corresponds to the one in FIG. 7 without step 706. Specifically, if it is not an asymmetric collision (i.e., step 705=NO), the electronic control unit 15 performs step 704. In contrast, if it is an asymmetric collision (i.e., step 705=YES), the electronic control unit 15 performs step 807. At step 807, the electronic control unit 15 performs the sensitization process. In other words, the electronic control unit 15 sets the safing determination threshold value corresponding to the non-faulty sensor among the left-side determination logic **153*d* and the right-side determination logic 153*e* in the safing judgment logic 153*b* to a low threshold regardless of whether it is a collision side sensor. After executing the sensitization process, at step 808, the electronic control unit 15 determines whether a predetermined time has elapsed since the sensitization process was executed. Before the predetermined time elapses (i.e., step 808=NO), the electronic control unit 15 maintains the low threshold setting state with the sensitization process. In contrast, if the predetermined time has elapsed (i.e., step 808=YES), the electronic control unit 15** resets the low threshold setting state by the sensitization process and sets the safing determination threshold value corresponding to the non-collision side sensor to the normal threshold value.

It goes without saying that the elements comprising the above embodiments are not necessarily essential, except when specifically stated as essential, or when clearly considered essential in principle, etc. Further, when numerical values of the number, amount, range, etc., of components are mentioned, the disclosure is not limited to those specific values, except when specifically stated as essential or when clearly limited in principle to a specific value. Similarly, when the shape, orientation, positional relationship, etc. of components, etc. are mentioned, the disclosure is not limited to such shape, orientation, positional relationship, etc., except when expressly stated as being particularly essential or when limited to a specific shape, orientation, positional relationship, etc. in principle.

Modifications are also not limited to the above examples. That is, parts of one embodiment and parts of another embodiment may be combined with each other. Further, a plurality of modifications may also be combined with each other. Furthermore, all or part of the above embodiments and all or part of the modifications may also be combined with each other.

What is claimed is:

1. A collision detection device configured to detect a frontal collision of a vehicle comprising:

a first acceleration acquisition unit which acquires a first longitudinal acceleration output from a left-side sensor, which is an acceleration sensor installed on the left-side of a vehicle body and detects the first longitudinal acceleration and a first lateral acceleration, and a second longitudinal acceleration output from a right-side sensor, which is an acceleration sensor installed on the right-side of a vehicle body and detects the second longitudinal acceleration and a second lateral acceleration;

a second acceleration acquisition unit which acquires a third longitudinal acceleration output from a main sensor, which is an acceleration sensor different from the left-side sensor and the right-side sensor and which detects the third longitudinal acceleration;

a frontal collision determination unit which determines an occurrence of the frontal collision in a case that: the first longitudinal acceleration exceeds a first threshold value or the second longitudinal acceleration exceeds a second threshold value; and the third longitudinal acceleration exceeds a third threshold value; and a threshold setting unit which sets the first threshold value or the second threshold value, wherein, when the left-side sensor has failed and the right-side sensor has not failed, the threshold setting unit performs a sensitization process to set the first threshold value lower than when both the left-side sensor and the right-side sensor have not failed, and when the left-side sensor has not failed and the right-side sensor has failed, the threshold setting unit performs the sensitization process to set the second threshold value lower than when both the left-side sensor and the right-side sensor have not failed.

2. The collision detection device according to claim 1, further comprising:

an asymmetric collision determination unit which determines that the frontal collision is an asymmetric collision, wherein the threshold setting unit performs the sensitization process when the asymmetric collision determination unit determines the asymmetric collision has occurred.

3. The collision detection device according to claim 2, wherein the threshold setting unit performs the sensitization process when the asymmetric collision determination unit determines the asymmetric collision and the failed sensor among the left-side sensor and the right-side sensor is on the collision side.

4. The collision detection device according to claim 1, wherein the threshold setting unit resets the sensitization process when a predetermined time has elapsed after the sensitization process is executed.

5. The collision detection device according to claim 2, wherein the threshold setting unit resets the sensitization process when a predetermined time has elapsed after the sensitization process is executed.

6. The collision detection device according to claim 3, wherein the threshold setting unit resets the sensitization process when a predetermined time has elapsed after the sensitization process is executed.

7. A collision detection method for detecting a frontal collision of a vehicle, comprising:

acquiring a first longitudinal acceleration output from a left-side sensor, which is an acceleration sensor installed on the left-side of a vehicle body and detects the first longitudinal acceleration and a first lateral acceleration, and a second longitudinal acceleration output from a right-side sensor, which is an acceleration sensor installed on the right-side of a vehicle body and detects the second longitudinal acceleration and a second lateral acceleration;

acquiring a third longitudinal acceleration output from a main sensor, which is an acceleration sensor different from the left-side sensor and the right-side sensor and which detects the third longitudinal acceleration;

determining an occurrence of the frontal collision in a case that: the first longitudinal acceleration exceeds a first threshold value or the second longitudinal acceleration exceeds a second threshold value; and the third longitudinal acceleration exceeds a third threshold value; and setting the first threshold value or the second threshold value, wherein the setting of the first threshold value or the second threshold value includes:

performing a sensitization process to set the first threshold value lower than when both the left-side sensor and the right-side sensor have not failed, when the left-side sensor has failed and the right-side sensor has not failed; and performing the sensitization process to set the second threshold value lower than when both the left-side sensor and the right-side sensor have not failed, when the left-side sensor has not failed and the right-side sensor has failed.

8. A non-transitory computer-readable medium having computer-executable instructions for detecting a frontal collision of a vehicle, the computer-executable instructions comprising:

a process of acquiring a first longitudinal acceleration output from a left-side sensor, which is an acceleration sensor installed on the left-side of a vehicle body and detects the first longitudinal acceleration and a first lateral acceleration, and a second longitudinal acceleration output from a right-side sensor, which is an acceleration sensor installed on the right-side of a vehicle body and detects the second longitudinal acceleration and a second lateral acceleration;

a process of acquiring a third longitudinal acceleration output from a main sensor, which is an acceleration sensor different from the left-side sensor and the right-side sensor and which detects the third longitudinal acceleration; and a process of determining an occurrence of the frontal collision in a case that: the first longitudinal acceleration exceeds a first threshold value or the second longitudinal acceleration exceeds a second threshold value; and the third longitudinal acceleration exceeds a third threshold value; and a process of setting the first threshold value or the second threshold value, wherein the process of setting the first threshold value or the second threshold value includes:

performing a sensitization process to set the first threshold value lower than when both the left-side sensor and the right-side sensor have not failed, when the left-side sensor has failed and the right-side sensor has not failed; and performing the sensitization process to set the second threshold value lower than when both the left-side sensor and the right-side sensor have not failed, when the left-side sensor has not failed and the right-side sensor has failed.

* * * * *